United States Patent
Liao et al.

(10) Patent No.: US 11,092,771 B2
(45) Date of Patent: Aug. 17, 2021

(54) IMAGING DEVICE

(71) Applicant: SZ DJI TECHNOLOGY CO., LTD., Shenzhen (CN)

(72) Inventors: Ran Liao, Shenzhen (CN); Peng Bin, Shenzhen (CN); Hao Liu, Shenzhen (CN); Xifeng Zhao, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 167 days.

(21) Appl. No.: 16/122,307

(22) Filed: Sep. 5, 2018

(65) Prior Publication Data
US 2019/0018214 A1 Jan. 17, 2019

Related U.S. Application Data

(63) Continuation of application No. PCT/CN2016/078180, filed on Mar. 31, 2016.

(51) Int. Cl.
*G02B 7/02* (2021.01)
*G02B 7/04* (2021.01)
*G03B 17/12* (2021.01)
*G03B 15/00* (2021.01)
*G03B 5/00* (2021.01)

(52) U.S. Cl.
CPC ............ *G02B 7/026* (2013.01); *G02B 7/021* (2013.01); *G02B 7/04* (2013.01); *G03B 5/00* (2013.01); *G03B 15/006* (2013.01); *G03B 17/12* (2013.01)

(58) Field of Classification Search
CPC .......... G02B 7/026; G02B 7/02; G02B 7/021; G02B 7/04; G02B 7/06–10; G03B 5/00; G03B 15/006; G03B 17/12

USPC ................ 359/819, 821, 822, 823, 824, 825
See application file for complete search history.

(56) References Cited

U.S. PATENT DOCUMENTS

| 2006/0033973 | A1* | 2/2006 | Chou ..................... G02B 7/08 359/210.1 |
| 2016/0070115 | A1 | 3/2016 | Miller et al. |

FOREIGN PATENT DOCUMENTS

| CN | 1326108 | A | 12/2001 |
| CN | 1967368 | A | 5/2007 |
| CN | 101587221 | A | 11/2009 |
| CN | 101625502 | A | 1/2010 |
| CN | 102360112 | A | 2/2012 |
| CN | 203902844 | U | 10/2014 |
| CN | 104583073 | A | 4/2015 |
| CN | 108137151 | A | 6/2018 |

OTHER PUBLICATIONS

English language machine translation of CN1967368, May 23, 2007 (Year: 2007).*
The World Intellectual Property Organization (WIPO) International Search Report and Written Opinion for PCT/CN2016/078180 dated Jan. 22, 2017 7 pages

* cited by examiner

*Primary Examiner* — Marin Pichler
(74) *Attorney, Agent, or Firm* — Anova Law Group, PLLC

(57) ABSTRACT

A lens locking apparatus is configured to be coupled to a lens module. The lens module is configured to focus on an object by translating along an optical axis of the lens module. The lens locking apparatus is configured to fix a position of the lens module by applying a compressive force on the lens module when the lens module is at a focused position.

10 Claims, 12 Drawing Sheets

IMAGING DEVICE

CROSS-REFERENCE TO RELATED APPLICATION

This application is a continuation of International Application No. PCT/CN2016/078180, filed on Mar. 31, 2016, the entire contents of which are incorporated herein by reference.

BACKGROUND

Aerial vehicles, such as unmanned aerial vehicles (UAVs), have been developed for a wide range of applications including photograph, surveillance, search and rescue operations, exploration, and other fields. Such UAVs can carry onboard cameras to capture still images and video images. Stable images are desired in applications such as aerial photograph.

The UAV is subject to vibrations during images capturing. The vibrations can be high frequency vibrations and low frequency vibrations transmitted from propulsion unit of the UAV such as propellers. The vibrations can also be introduced from environment such as air turbulence or wind. The vibrations can be partially filtered out by damping devices such as rubber balls disposed between the UAV and a stabilization platform carrying the camera and compensated by the stabilization platform such as a three-axis gimbal.

SUMMARY

Systems and methods are provided for a stable imaging of a camera onboard a UAV. It may be desirable to fix a position of the optical lens at a focused position upon a completion of focusing, such that the captured images may not be adversely affected by a vibration of lens or a loss of focus. In some embodiments of the present disclosure, a lens locking apparatus can be provided in the camera to fix the optical lens at a focused position upon completion of focusing the lens on an object, such that the lens does not move or vibrate, and the focus on object is secured. In some instances, the lens locking apparatus can be a pressing member which abuts against the lens module and applies a compressive force on the lens module when the lens module is at the focused position. For instance, the pressing member can be an elastic plate or a leaf spring. The abutting of the pressing member against the lens module can be controlled by an actuator such as a cam, or an electromagnet. The present disclosure also provides a stabilization platform carrying the imaging system having the lens locking apparatus and an unmanned aerial vehicle (UAV) carrying the stabilization platform.

An aspect of the disclosure may include lens locking apparatus configured to be coupled to a lens module, the lens module being configured to focus on an object by translating along an optical axis of the lens module, wherein the lens locking apparatus is configured to fix a position of the lens module by applying a compressive force on the lens module when the lens module is at a focused position.

Aspects of the disclosure may also include a method of fixing a lens module, the method comprising focusing the lens module on an object by translating the lens module along an optical axis of the lens module; and fixing a position of the lens module by a lens locking apparatus when the lens module is at a focused position, wherein the lens locking apparatus is configured to apply a compressive force on the lens module when the lens module is at the focused position.

Aspects of the disclosure may also include an imaging device for capturing images, the imaging device comprising: a lens module configured to focus on an object by translating along an optical axis of the lens module; and a lens locking apparatus configured to be coupled to a lens module, wherein the lens locking apparatus is configured to fix a position of the lens module by applying a compressive force on the lens module when the lens module is at a focused position.

Aspects of the disclosure may also include a method of capturing images with an imaging device, the method comprising: focusing the lens module on an object by translating the lens module along an optical axis of the lens module; fixing a position of the lens module by a lens locking apparatus when the lens module is at a focused position, wherein the lens locking apparatus is configured to apply a compressive force on the lens module when the lens module is at the focused position; and capturing images of the object when the lens module is fixed at the focused position.

Aspects of the disclosure may also include a stabilizing platform for stabilizing a payload, said stabilizing platform comprising: a frame assembly comprising a plurality of frame components movable relative to one another, said frame assembly being configured to support the payload; and a plurality of actuators configured to permit the plurality of frame components to move relative to one another, wherein the payload is an imaging device for capturing images, said imaging device comprising: a lens module configured to focus on an object by translating along an optical axis of the lens module; and a lens locking apparatus configured to be coupled to a lens module, wherein the lens locking apparatus is configured to fix a position of the lens module by applying a compressive force on the lens module when the lens module is at a focused position.

Aspects of the disclosure may also include movable object, comprising: a body; one or more propulsion units carried by the body and configured to effect a moving of the movable object; and a stabilizing platform for stabilizing a payload, said stabilizing platform comprising: a plurality of frame components movable relative to one another, said frame assembly being configured to support the payload; and a plurality of actuators configured to permit the plurality of frame components to move relative to one another, wherein the payload is an imaging device for capturing images, said imaging device comprising: a lens module configured to focus on an object by translating along an optical axis of the lens module; and a lens locking apparatus configured to be coupled to a lens module, wherein the lens locking apparatus is configured to fix a position of the lens module by applying a compressive force on the lens module when the lens module is at a focused position.

It shall be understood that different aspects of the disclosure can be appreciated individually, collectively, or in combination with each other. Various aspects of the disclosure described herein may be applied to any of the particular applications set forth below or for any other types of movable objects. Any description herein of aerial vehicles, such as unmanned aerial vehicles, may apply to and be used for any movable object, such as any vehicle. Additionally, the systems, devices, and methods disclosed herein in the context of aerial motion (e.g., flight) may also be applied in the context of other types of motion, such as movement on the ground or on water, underwater motion, or motion in space.

Other objects and features of the present disclosure will become apparent by a review of the specification, claims, and appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

DETAILED DESCRIPTION

The systems and methods described in this disclosure permit a stable imaging of a camera onboard a UAV by fixing a position of the lens at a focused position upon a completion of focusing. The vibrations introduced from the UAV and flight environment to the camera onboard the UAV can only be partially filtered out or compensated by damping devices and the gimbal, thus the camera may still experience vibrations which may adversely affect the imaging quality and make the captured images blurred. In some embodiments of the present disclosure, a lens locking apparatus can be provided in the camera to fix the optical lens at a focused position upon completion of focusing the lens on an object, such that the lens does not move or vibrate and the focus on object is secured. In some instances, the lens locking apparatus can be a pressing member which abuts against the lens module and applies a compressive force on the lens module when the lens module is at the focused position. Alternatively, the pressing member can constantly abut against the lens module, and a friction between the pressing member and the lens module can be designed as being smaller than a force generated from a focusing module (e.g., a motor driving the lens module to translate along an optical axis) but larger than an inertial force generated by a vibration of the lens module.

Figure 1:
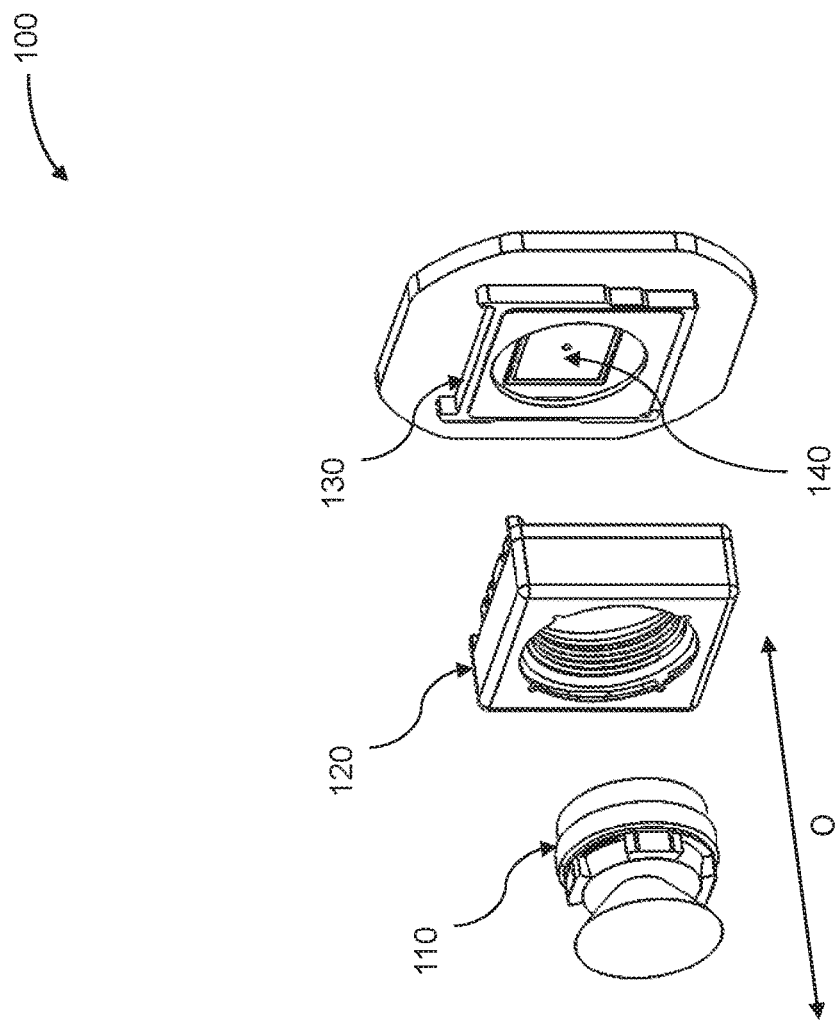
FIG. 1 illustrates a lens module to which a lens locking apparatus is not provided, in accordance with some embodiments of the disclosure.

FIG. 1 illustrates a lens module to which a lens locking apparatus is not provided, in accordance with some embodiments of the disclosure. The lens module 100 comprises a lens carrier 110, a focusing module 120, a sensor board 130, and an image sensor 140 mounted on the sensor board 130. The lens carrier can carry one or more optical lenses thereon. The optical lens can collect light from an object to be captured. The focusing module can be an Auto Focus (AF) module or a Manual Focus module, and is configured to receive the lens carrier and connected to the sensor board.

In some instances, the AF module can be provided as a barrel through which the lens carrier can move along an optical axis O of the one or more optical lenses. In some instances, the AF module can comprise a driving mechanism to drive the lens carrier move back and forth along the optical axis in response to a signal indicative whether the process of focusing the lens module on an object is completed. In some embodiments, the driving mechanism is a voice coil motor (VCM). The voice coil motor is a linear DC motor in which the motor can move to one direction by applying a voltage across the terminals of the motor, and the motor can move to an opposite direction by reversing the polarity of the applied voltage. The VCM can comprise a non-movable part such as a magnetic housing and a movable part such as a coil part. In some instances, both the magnetic housing and the coil part of the VCM can be provided in the AF module. The coil part can be driven to translation within the magnetic housing along the optical axis O when electric current is supplied to the coil. The lens carrier can be mounted to the coil part by a snap fit, a screw, a threaded connection, welding or glue, such that the lens carrier can be moved along an optical axis O by the VCM. Alternatively, the coil part of the VCM can be provided in the lens carrier, such that the lens carrier can be moved along an optical axis O when electric current is supplied to the coil.

The focusing module can be mounted on the sensor board which can carry at least one optical sensor. The optical sensor can receive light transmitted through the optical lens and convert the received light into electrical signals, such that images of the captured objects can be generated.

The lens module can be provided in a camera which is carried onboard a movable object. The movable object can be a vehicle such as an aerial vehicle. For example, the aerial vehicles may be fixed-wing aircraft (e.g., airplane, gliders), rotary-wing aircraft (e.g., helicopters, rotorcraft), aircraft having both fixed wings and rotary wings, or aircraft having neither (e.g., blimps, hot air balloons). In some embodiments, the aerial vehicle is an unmanned aerial vehicle (UAV). The camera can experience vibration which is transmitted from the UAV and vibration introduced from environment in which the UAV performs a flight. The vibration from the UAV can be generated by propulsion units of the UAV such as propellers. The vibration from the environment may be generated by air turbulence or wind. The vibrations can be partially filtered out by damping devices such as rubber balls and compensated by a stabilization platform such as a three-axis gimbal. However, the vibration which is not filtered out may be transmitted to the camera onboard the UAV, causing the lens module vibrate during image capturing. The vibration experienced by the lens module can move the lens back and forth along the optical axis, such that a focus position of the optical lens is not stable during image capturing, and the captured images may be blurred.

Figure 2:
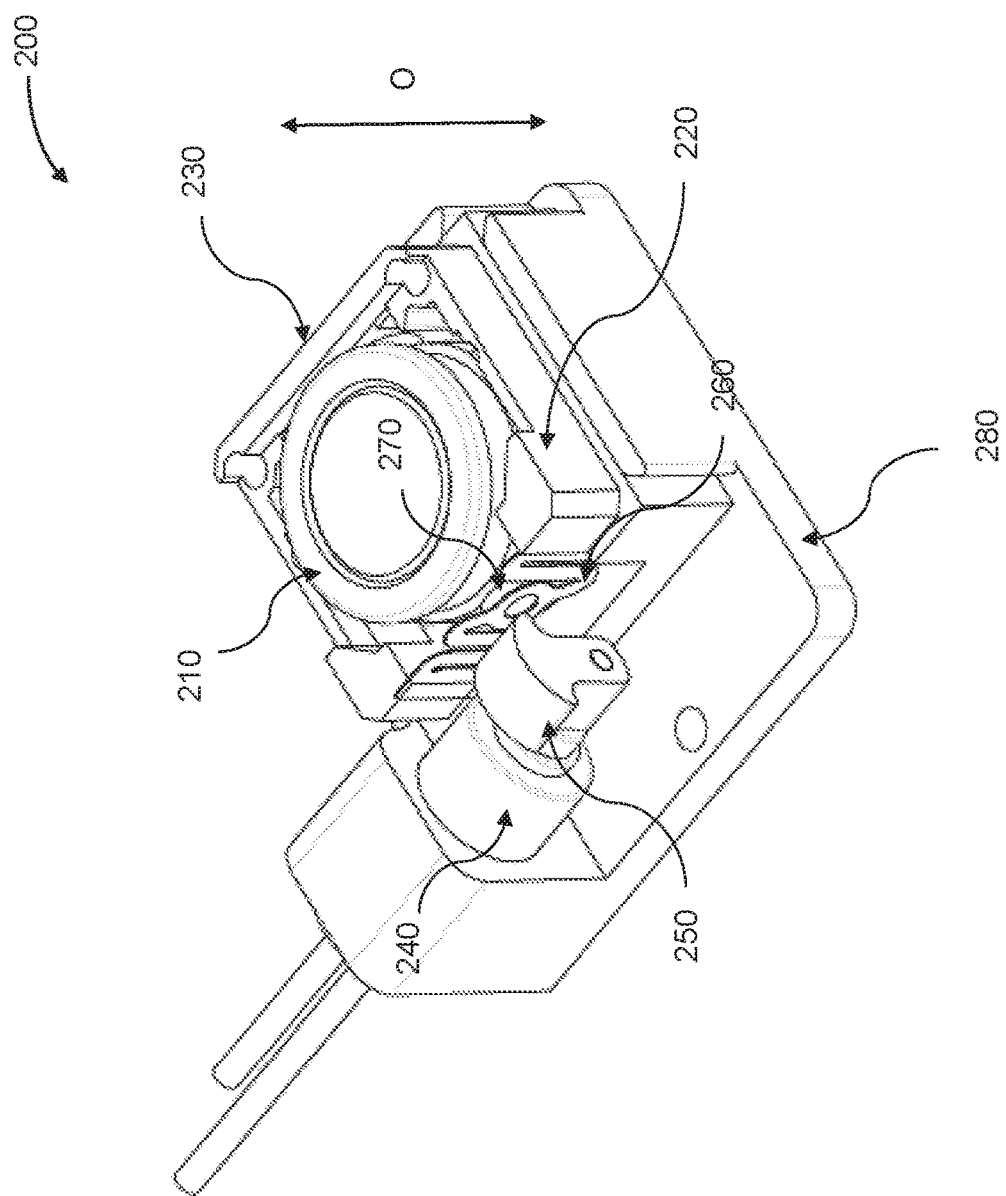
FIG. 2 illustrates a lens module having a lens locking apparatus comprising a cam and an elastic plate, in accordance with some embodiments of the disclosure.

FIG. 2 illustrates a lens module having a lens locking apparatus comprising a cam and an elastic plate, in accordance with some embodiments of the disclosure. The lens module 200 can comprise a lens carrier 210, an Auto Focus (AF) module 220 and a sensor board (not shown). The lens carrier can carry at least one optical lens thereon which receives optical light from a target object. In some instances, the lens carrier can be provided in a barrel shape. For instance, the lens carrier can be provided as a hollow cylinder in which the at least one optical lens is disposed. The lens carrier can be disposed in the AF module, for instance, within an internal space surrounded by side walls of the AF module. The lens carrier can be moved with relative to the AF module. The AF module can comprise a driving mechanism 230 to drive the lens carrier move back and forth along an optical axis O of the at least one lens. For instance, the driving mechanism can be a voice coil motor which moves the lens carrier along the optical axis in response to a signal indicative whether a process of focusing the lens module on the target object is completed. The sensor board and the AF module can be disposed on a camera frame 280.

The lens locking apparatus can comprise a pressing member 260, an actuator 250 and a power source 240. The pressing member can be positioned adjacent to the lens carrier. In some instances, the pressing member can be positioned adjacent to a peripheral wall of the lens carrier. In some embodiments, the pressing member is provided at a side of the lens carrier opposite to the driving mechanism of the AF module. The pressing member can exert a compressive force on the lens carrier when the lens carrier is at a focused position. In some embodiments, the pressing member abuts against a peripheral wall of the lens carrier when the lens carrier is at the focused position.

In some embodiments, the pressing member can be an elastic member which can be deformed by applying a compressive force thereon. For instance, the elastic member can be an elastic plate. The two lateral ends of the elastic plate can be fixed, and a middle portion of the elastic plate can be deformed in a direction perpendicular to an extending surface of the elastic plate by an external force applied thereon. The elastic plate can return to an original position if an external force applied thereon is removed. In some instances, the elastic plate can be provided on the AF module where a portion of a peripheral wall of the AF module is removed. The two lateral ends of the elastic plate can be fixed at the peripheral wall of the AF module, and a middle portion of the elastic plate can be deformed in a direction which is substantially perpendicular to an extending surface of the elastic plate and also substantially orthogonal to the optical axis of the lens carrier. The pressing member can exert a compressive force on the lens carrier in a direction substantially orthogonal to the optical axis of the lens carrier. The elastic plate can be made from materials such as beryllium copper.

In some embodiments, the pressing member abuts against the lens carrier only when the focusing process of the camera is completed and the lens carrier is at the focused position. In other words, the pressing member may not contact the lens carrier and exert a compressive force to the lens carrier when the focusing process is in progress, for example, when the lens carrier is driven by the driving mechanism to translate along the optical axis. The pressing member can be driven by the actuator 250 to control a timing of contacting and exerting a compressive force on the lens carrier. In some embodiments, the actuator is a cam. The cam can be an eccentric wheel which presses the pressing member in a reciprocating manner. For instance, the cam can be rotated by the power source 240 such as a motor, such that the cam applies the pressing member when a protrusion of the cam contacts the pressing member.

The motor can rotate to contact the cam with the pressing member in response to a signal received from the AF module. In some instances, the signal received from the AF module can be a signal indicative of whether a focusing process is completed. The motor can rotate to contact the cam with the pressing member when a signal is received from the AF module indicative of a completion of the focusing process and the lens carrier is at the focused position.

When the pressing member is pushed by the cam to abut against the lens carrier, a friction can be generated between the pressing member and the lens module. The friction can be designed to ensure a position of the lens carrier can be fixed upon pressing the pressing member onto the lens carrier. For instance, the friction can be designed or predetermined by considering various factors including a maximum vibration experienced by the lens carrier, material characteristics of the pressing member, material characteristics of the lens carrier, an applying force of the cam, etc. The friction between the pressing member and the lens module can be larger than an inertial force generated by a vibration of the lens carrier, such that the lens carrier does not move along the optical axis or vibrate with respect to the AF module when the lens carrier is at the focused position. A stable imaging can be obtained if the lens carrier is fixed at the focused position, for example, the captured images are not blurred due to a loss of focusing.

Alternatively, the pressing member can constantly abut against the lens carrier regardless of a position of the lens carrier. In other words, the pressing member may contact the lens carrier and exert a compressive force to the lens carrier during the entire process of focusing and capturing, even when the lens carrier is driven by the driving mechanism to translate along the optical axis. In this case, the cam may not be provided to push the pressing member against the lens carrier. In some instances, the pressing member can constantly abuts against a peripheral wall of the lens carrier and thus a friction is constantly generated between the pressing member and the lens carrier.

The friction can be designed to ensure a position of the lens carrier can be when the lens carrier is at the focused position, and meanwhile, the lens carrier can be moved along the optical axis in the focusing process. In some embodiments, the friction between the pressing member and the lens carrier can be smaller than a force generated from the driving mechanism but larger than an inertial force generated by a vibration of the lens carrier. For instance, a kinetic friction between the pressing member and the lens carrier can be smaller than a driving force from the driving mechanism, such that the driving mechanism can move the lens carrier along the optical axis of the lens carrier in the focusing process. A static friction can be larger than an inertial force generated by a maximum vibration of the lens carrier, such that the lens carrier does not move along the optical axis or vibrate with respect to the AF module when the lens carrier is at the focused position. The friction can be designed by considering various factors including a maximum vibration experienced by the lens carrier, material characteristics of the pressing member, material characteristics of the lens carrier, an applying force of the cam, etc.

Figure 3:
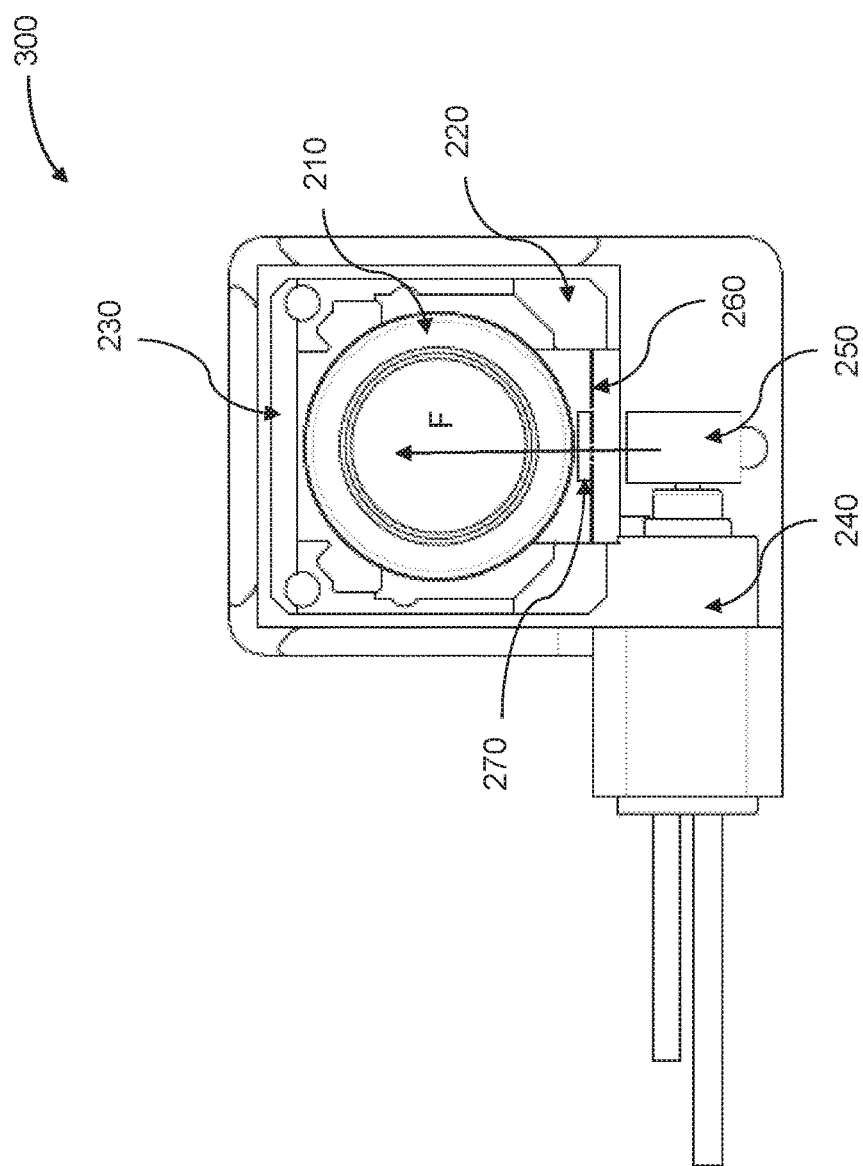
FIG. 3 illustrates a lens module having a lens locking apparatus comprising a cam and an elastic plate, in accordance with some embodiments of the disclosure.

FIG. 3 illustrates a lens module having a lens locking apparatus comprising a cam and an elastic plate, in accordance with some embodiments of the disclosure. FIG. 3 is a top view of the FIG. 2, showing a positional relation between the pressing member 260 and the lens carrier 210. The lens carrier can carry at least one optical lens and be provided within an internal space of the AF module 220. The lens carrier can be driven to move with respect to the AF module along the optical axis by a driving mechanism 230 of the AF module. The driving mechanism can be a voice coil motor.

The pressing member 260 can be provided at a side of the lens carrier opposite to the driving mechanism of the AF module. Alternatively, the pressing member can be provided adjacent to the driving mechanism of the AF module. In some embodiments, the pressing member is an elastic plate. The two lateral ends of the elastic plate can be fixed at the peripheral wall of the AF module, and a middle portion of the elastic plate can be deformed in a direction which is substantially perpendicular to an extending surface of the elastic plate and also substantially orthogonal to the optical axis of the lens carrier. In some embodiments, the elastic plate exerts a compressive force on the lens carrier in a direction F which substantially orthogonally intersects with the optical axis. Alternatively, the elastic plate can exert a compressive force on the lens carrier in a direction F which is substantially oblique to the optical axis. The compressive force exerted from the elastic plate can fix the lens carrier at a focused position when the lens carrier is at the focused position. The elastic plate can be an elastic plate which can be deformed to contact the lens carrier or constantly contact the lens carrier.

In some embodiments, the elastic plate can be driven by an actuator 250. In some embodiments, the actuator is a cam. The cam can be rotated by the motor 240 to control a timing of applying the elastic plate into contact with the lens carrier. The motor can rotate to contact the cam with the elastic plate in response to a signal received from the AF module. The signal received from the AF module can be a signal indicative of whether a focusing process is completed and the lens carrier is at the focused position.

In some embodiments, at least one friction pad 270 can be provided with the elastic plate on a side contacting the lens carrier. The friction of fixing the position of the lens carrier can be provided by a contact between the friction pad and the peripheral wall of the lens carrier. A material of the friction pad can be selected to provide sufficient friction with the lens carrier. The friction pad can be made from materials such as rubber. As discussed hereinabove, the friction pad can be pressed to contact the lens carrier only when the lens carrier is at the focused position, or can constantly abut against the lens carrier regardless of a position of the lens carrier.

Figure 4:
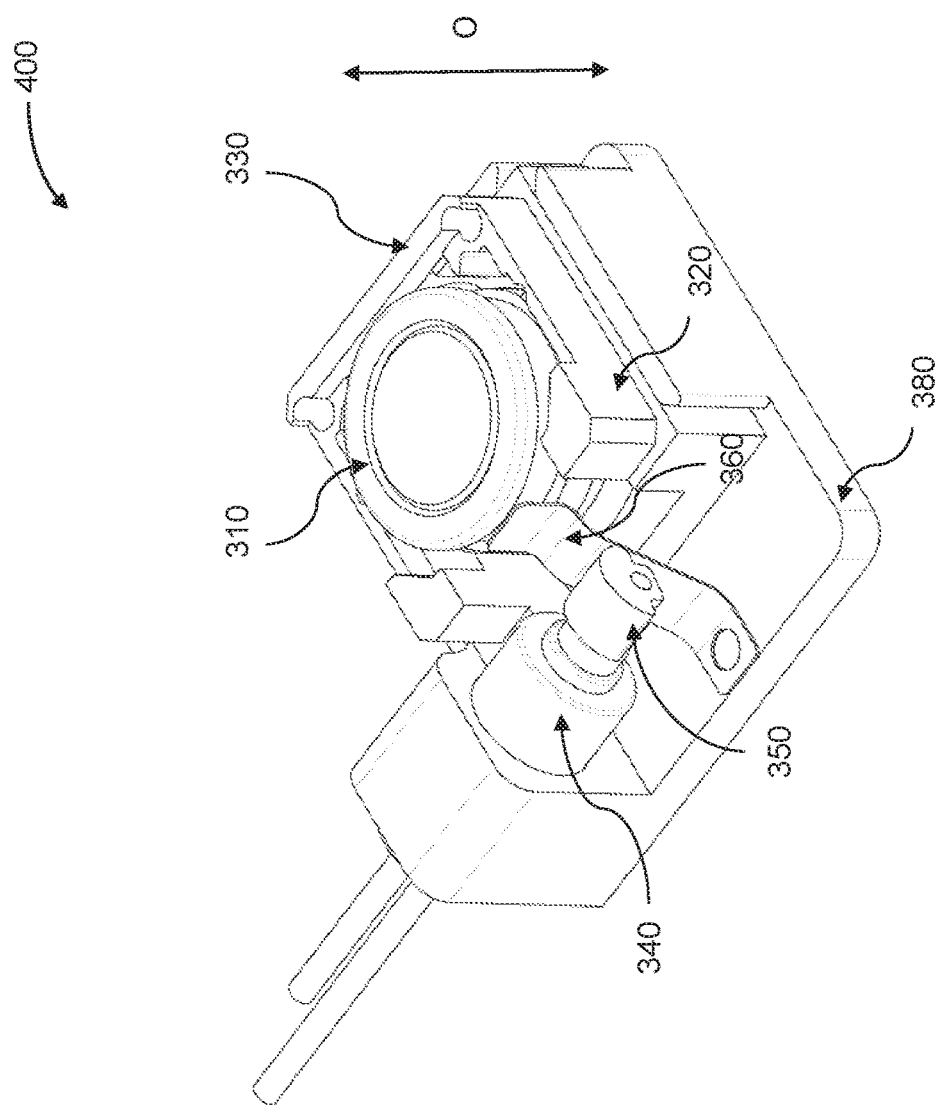
FIG. 4 illustrates another lens module having a lens locking apparatus comprising a cam and a leaf spring, in accordance with some embodiments of the disclosure.

FIG. 4 illustrates another lens module having a lens locking apparatus comprising a cam and a leaf spring, in accordance with some embodiments of the disclosure. The lens carrier 310 can carry at least one optical lens and be provided within an internal space of the AF module 320. The lens carrier can be driven to move with respect to the AF module along an optical axis O of the lens carrier by a driving mechanism 330 of the AF module, such as a voice coil motor.

The lens locking apparatus can comprise a pressing member 360, an actuator 350 and a power source 340. The pressing member 360 can be provided at a side of the lens carrier opposite to the driving mechanism of the AF module. The pressing member can exert a compressive force on the lens carrier in a direction substantially orthogonal to the optical axis. The compressive force exerted from the pressing member can fix the lens carrier at a focused position upon completion of the focusing process. In some embodiments, the pressing member is a leaf spring. The leaf spring can be made from a metal material such as spring steel. Alternatively, the leaf spring can be made from a plastic material.

A fixed end of the leaf spring can be fixed on the camera frame 380 on which the sensor board (not shown) and the AF module are disposed. The fixed end of the leaf spring can be fixed on the camera frame via a fixture means such as a bolt, a screw or a nut. Alternatively, the fixed end of the leaf spring can be fixed on the camera frame by welding or gluing. A free end of the leaf spring can be positioned adjacent to the lens carrier. In some instances, the free end of the leaf spring can be positioned adjacent to a peripheral wall of the lens carrier. In some embodiments, the free end of the leaf spring is positioned at a side of the lens carrier opposite to the driving mechanism of the AF module. The free end of the leaf spring can exert a compressive force on the lens carrier and fix the lens carrier at the focus position when the lens carrier is at the focused position.

In some embodiments, the free end of the leaf spring abuts against the lens carrier only when the focusing process of the camera is completed and the lens carrier is at the focused position. Alternatively, the free end of the leaf spring can constantly abut against the lens carrier regardless of a position of the lens carrier. The free end of the leaf spring can be driven by the actuator 350 to control a timing of contacting and exerting a compressive force on the lens carrier. In some instances, the actuator is a cam. The cam can be rotated by the power source 340 such as a motor, such that the cam applies the free end of the leaf spring when a protrusion of the cam contacts the leaf spring. The motor can rotate to contact the cam with the leaf spring in response to a signal received from the AF module. In some instances, the signal received from the AF module can be a signal indicative of whether a focusing process is completed.

When the free end of the leaf spring is pushed by the cam to abut against the lens carrier, a friction can be generated between the free end of the leaf spring and the lens module. The friction can be designed to ensure a position of the lens carrier can be fixed upon pressing the free end of the leaf spring onto the lens carrier.

Figure 5:
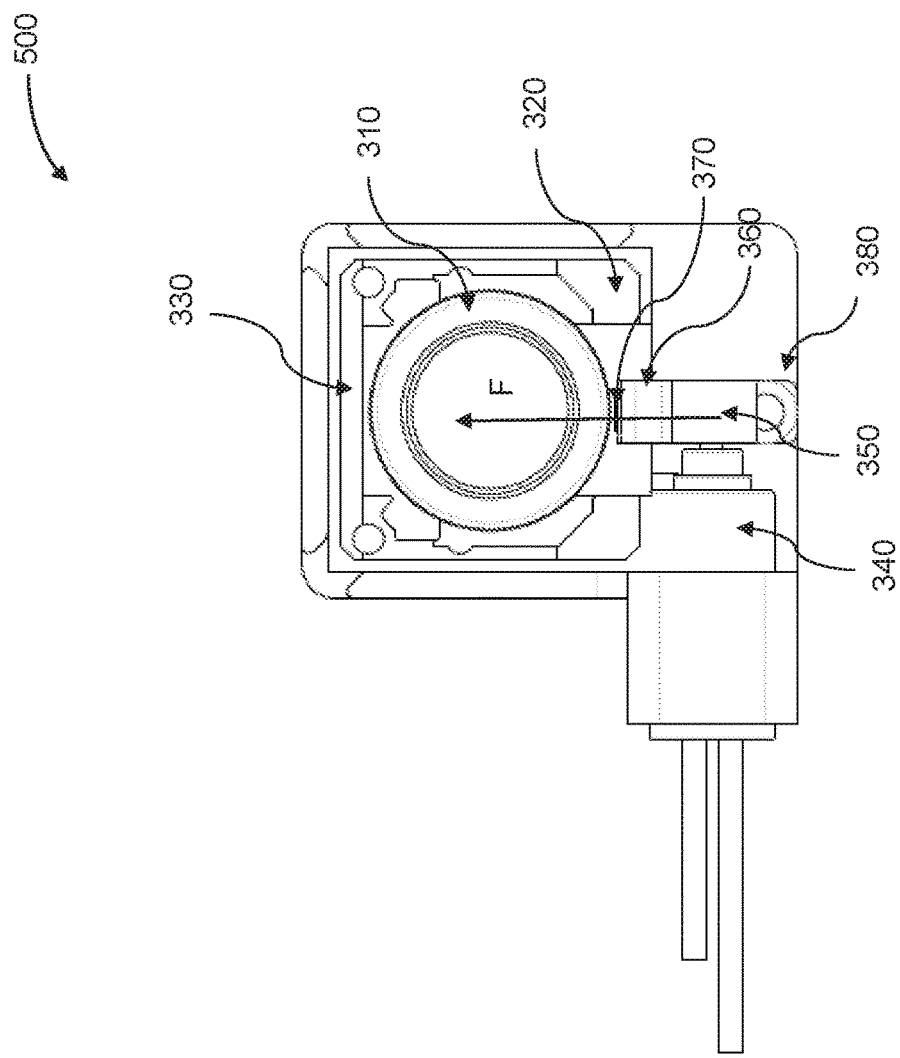
FIG. 5 illustrates another lens module having a lens locking apparatus comprising a cam and a leaf spring, in accordance with some embodiments of the disclosure.

FIG. 5 illustrates another lens module having a lens locking apparatus comprising a cam and a leaf spring, in accordance with some embodiments of the disclosure. FIG. 5 is a top view of the FIG. 4, showing a positional relation between the pressing member 360 and the lens carrier 310. The lens carrier can carry at least one optical lens and be provided within an internal space of the AF module 320. The lens carrier can be driven to move with respect to the AF module along the optical axis of the lens carrier by a driving mechanism 330 of the AF module. The driving mechanism can be a voice coil motor.

The pressing member 360 can be provided at a side of the lens carrier opposite to the driving mechanism of the AF module. In some embodiments, the pressing member is a leaf spring. The fixed end of the leaf spring can be fixed on a camera frame 380 on which the sensor board (not shown) and the AF module are disposed. The free end of the leaf spring can be positioned adjacent to the lens carrier. The free end of the leaf spring can exert a compressive force on the lens carrier in a direction F which substantially orthogonally intersects with the optical axis. Alternatively, the free end of the leaf spring can exert a compressive force on the lens carrier in a direction F which is substantially oblique to the optical axis. The compressive force exerted from the free end of the leaf spring can fix the lens carrier at a focused position when the lens carrier is at the focused position.

In some embodiments, the free end of the leaf spring can be driven by an actuator 350 such as a cam. The cam can be rotated by the power source 340 such as a motor to control a timing of urging the free end of the leaf spring into contact with the peripheral wall of the lens carrier. The motor can rotate to contact the cam with the free end of the leaf spring in response to a signal received from the AF module which is indicative of whether a focusing process is completed and the lens carrier is at the focused position.

In some embodiments, a friction pad 370 can be provided with the free end of the leaf spring on a side contacting the lens carrier. The friction of fixing the position of the lens carrier can be provided by a contact between the friction pad and the peripheral wall of the lens carrier. A material of the friction pad can be selected to provide sufficient friction with the lens carrier. The friction pad can be made from materials such as rubber. As discussed hereinabove, the friction pad can be pressed to contact the lens carrier only when the lens carrier is at the focused position, or can constantly abut against the lens carrier regardless of a position of the lens carrier.

Figure 6:
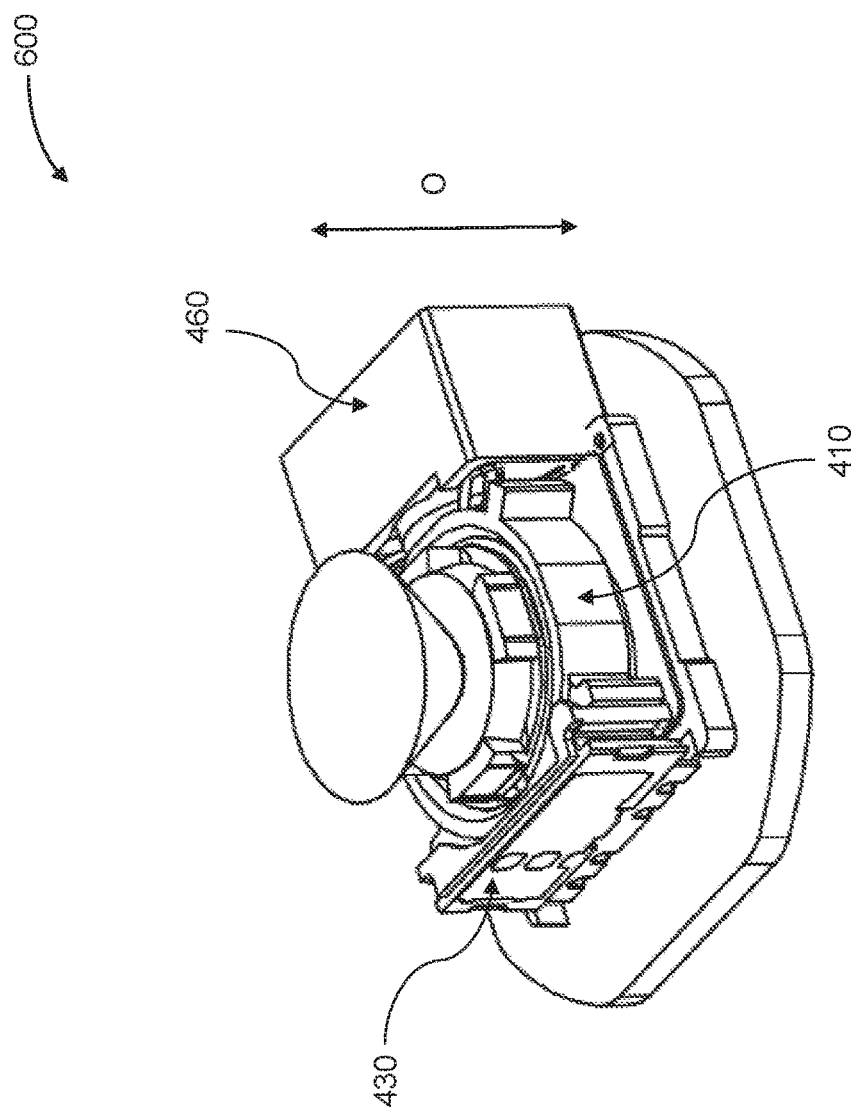
FIG. 6 illustrates still another lens module having a lens locking apparatus comprising an electromagnet, in accordance with some embodiments of the disclosure.

FIG. 6 illustrates still another lens module having a lens locking apparatus comprising an electromagnet, in accordance with some embodiments of the disclosure. The lens carrier 410 can carry at least one optical lens and can be driven to move along an optical axis O of the lens carrier by a driving mechanism 430 of the AF module. The driving mechanism can be a voice coil motor which is provided at a side of the lens carrier.

A lens locking apparatus 460 can be provided at a side of the lens carrier. The lens locking apparatus can be configured to fix a position of the lens carrier when the lens carrier is at a focused position. In some instances, the lens locking apparatus is positioned at a side of the lens carrier opposite to the driving mechanism of the AF module. The lens locking apparatus can exert a compressive force on the lens carrier in a direction substantially orthogonal to the optical axis. The compressive force exerted from the lens locking apparatus can fix the lens carrier at a focused position upon completion of the focusing process.

Figure 7:
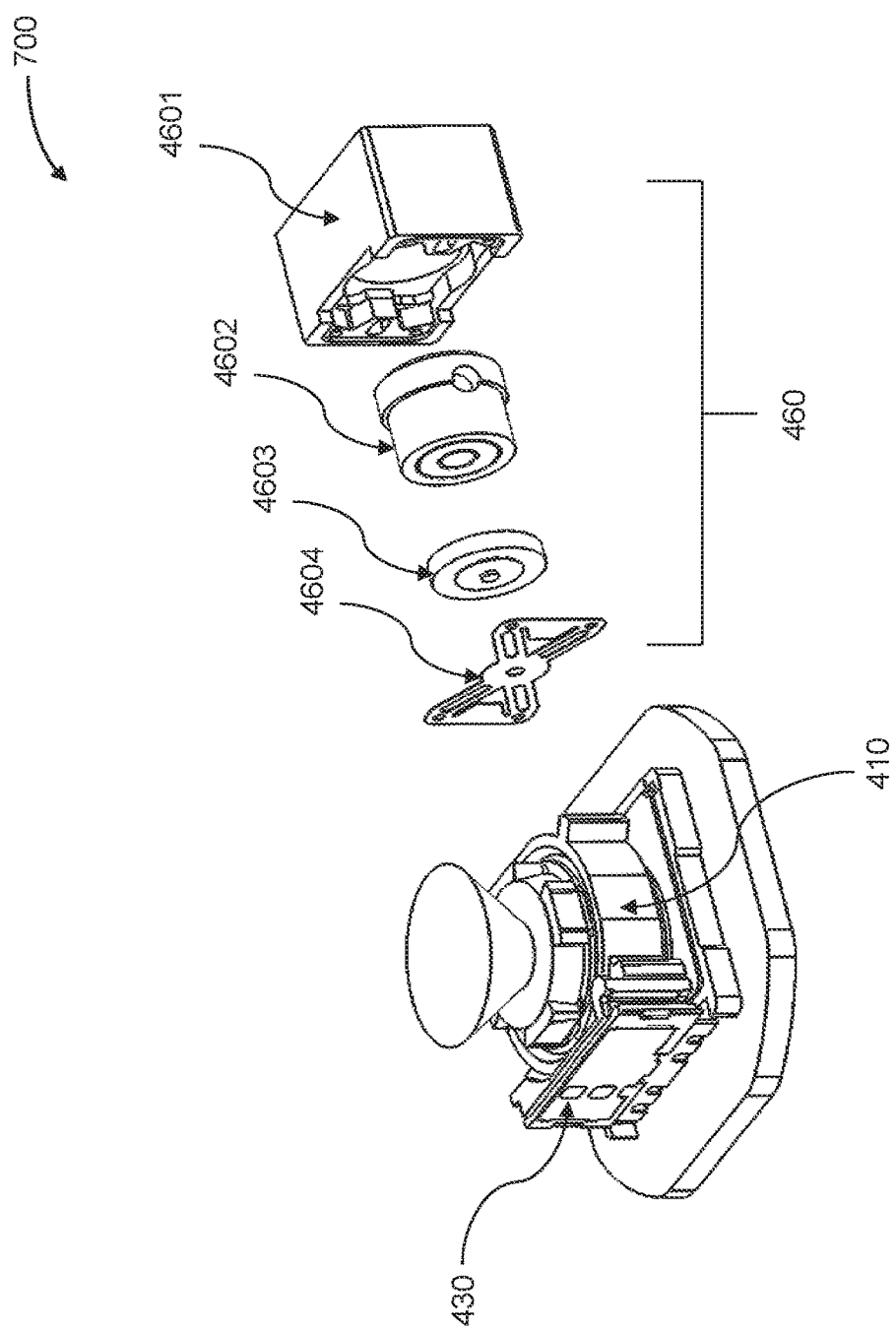
FIG. 7 illustrates still another lens module having a lens locking apparatus comprising an electromagnet, in accordance with some embodiments of the disclosure.

FIG. 7 illustrates still another lens module having a lens locking apparatus comprising an electromagnet, in accordance with some embodiments of the disclosure. The lens locking apparatus 460 can comprise an electromagnet 4602 to control an abutting of a pressing member 4604 against the lens carrier 410. The electromagnet can be a magnet in which the magnetic field is produced by an electric current applied on winding of the electromagnet. The magnetic field can be quickly generated and changed by controlling the on/off or amount of electric current in the winding. The electromagnet can be received within a housing 4601 of the lens locking apparatus.

The pressing member can be an elastic member such as a metal plate or a plastic plate. In some instances, the pressing member is an elastic plate which can be deformed in a direction substantially perpendicular to an extending surface thereof by an external force applied thereon. The elastic plate can return to an original position if an external force applied thereon is removed. The elastic plate can exert a compressive force on the lens carrier in a direction substantially orthogonal to the optical axis of the lens carrier. The two lateral ends of the elastic plate can be respectively fixed at opposite side walls of the housing of the lens locking apparatus, and a middle portion of the elastic plate can be deformed in a direction perpendicular to an extending surface of the elastic plate.

In some embodiments, the pressing member is an elastic plate made of iron. The middle portion of the elastic plate can be deformed in a direction perpendicular to an extending surface of the elastic plate upon the application of a magnetic field generated by the electromagnet. The direction perpendicular to an extending surface of the elastic plate can be substantially orthogonal to the optical axis of the lens carrier. For instance, the elastic plate can be pulled toward the electromagnet when a magnetic field is generated by the electromagnet, thus deforming toward the electromagnet. The elastic plate can be released to an original position if the magnetic field is not generated by the electromagnet.

Alternatively, an iron block 4603 can be provided to the pressing member on an end adjacent to the electromagnet. The iron block can be fixed to the pressing member via a fixture means such as a bolt, a screw, a nut, welding or glue. Alternatively, iron block can be fixed to the pressing member by welding or gluing. The iron block can be pulled toward the electromagnet when a magnetic field is generated by the electromagnet, thus deforming the pressing member toward the electromagnet. The pressing member can be released to an original position if the magnetic field is not generated by the electromagnet.

At an original position, the pressing member can abut against the lens carrier and exert a compressive force onto the lens carrier when the focusing process of the camera is completed and the lens carrier is at the focused position. In other words, the pressing member may not contact the lens carrier and exert a compressive force to the lens carrier when the focusing process is in progress. In some embodiments, the lens locking apparatus can control the electromagnet to generate a magnetic field in response to a signal received from the AF module. The signal received from the AF module can be a signal indicative of whether a focusing process is completed and the lens carrier is at the focused position. For instance, when the focusing process is in progress, the electromagnet can be controlled to generate a magnetic field to pull the pressing member away from the lens carrier, such that no compressive force is exerted onto the peripheral wall of the lens carrier and the lens carrier can translate along the optical axis by the driving of the driving mechanism 430 of the AF module. When the focusing process is completed and the lens carrier is at the focused position, the electromagnet can be controlled not to generate a magnetic field, such that the pressing member is released to the original position abutting again the lens carrier. A compressive force can be exerted onto the peripheral wall of the lens carrier, and the lens carrier can be fixed at the focused position by a friction between the pressing member and the peripheral wall of the lens carrier. The friction can be designed to ensure a position of the lens carrier can be fixed upon pressing the pressing member onto the lens carrier. For instance, the friction between the pressing member and the lens module can be larger than an inertial force generated by a maximum vibration of the lens carrier, such that the lens carrier does not move along the optical axis or vibrate with respect to the AF module when the lens carrier is at the focused position.

Figure 8:
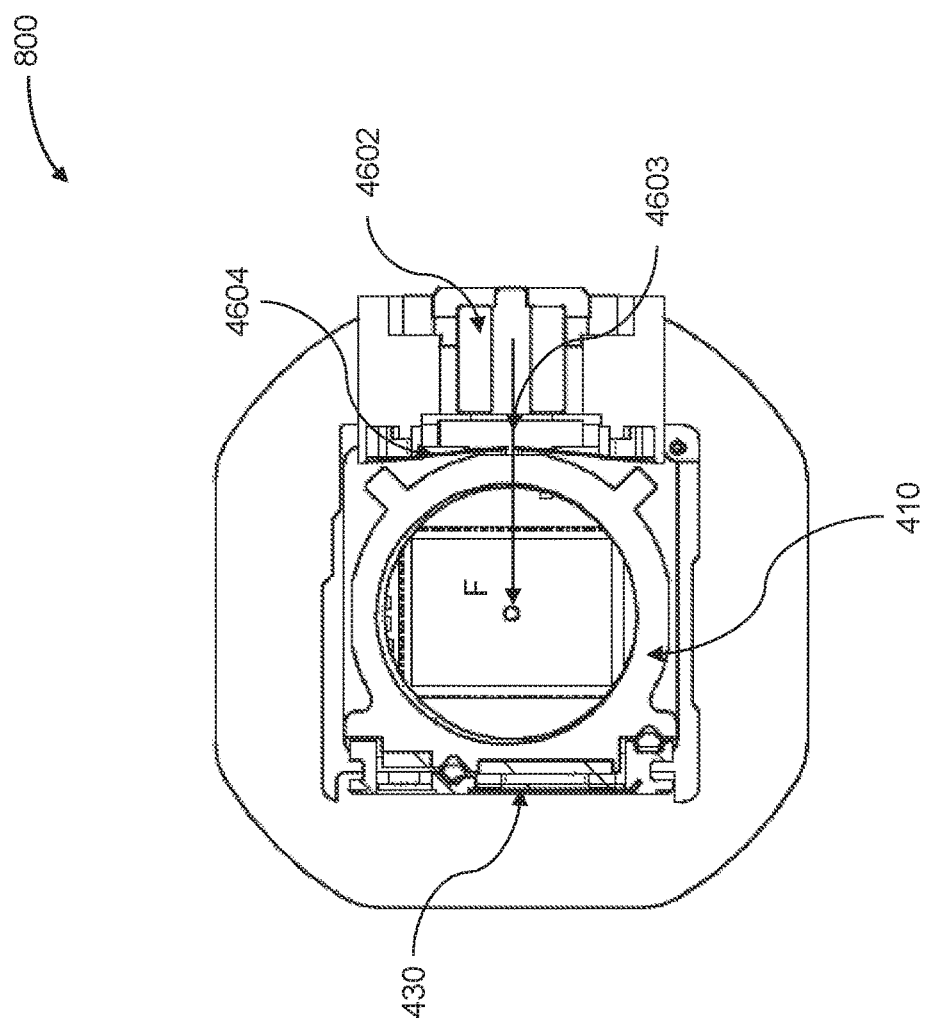
FIG. 8 illustrates still another lens module having a lens locking apparatus comprising an electromagnet, in which the position of lens module is fixed, in accordance with some embodiments of the disclosure.
Figure 9:
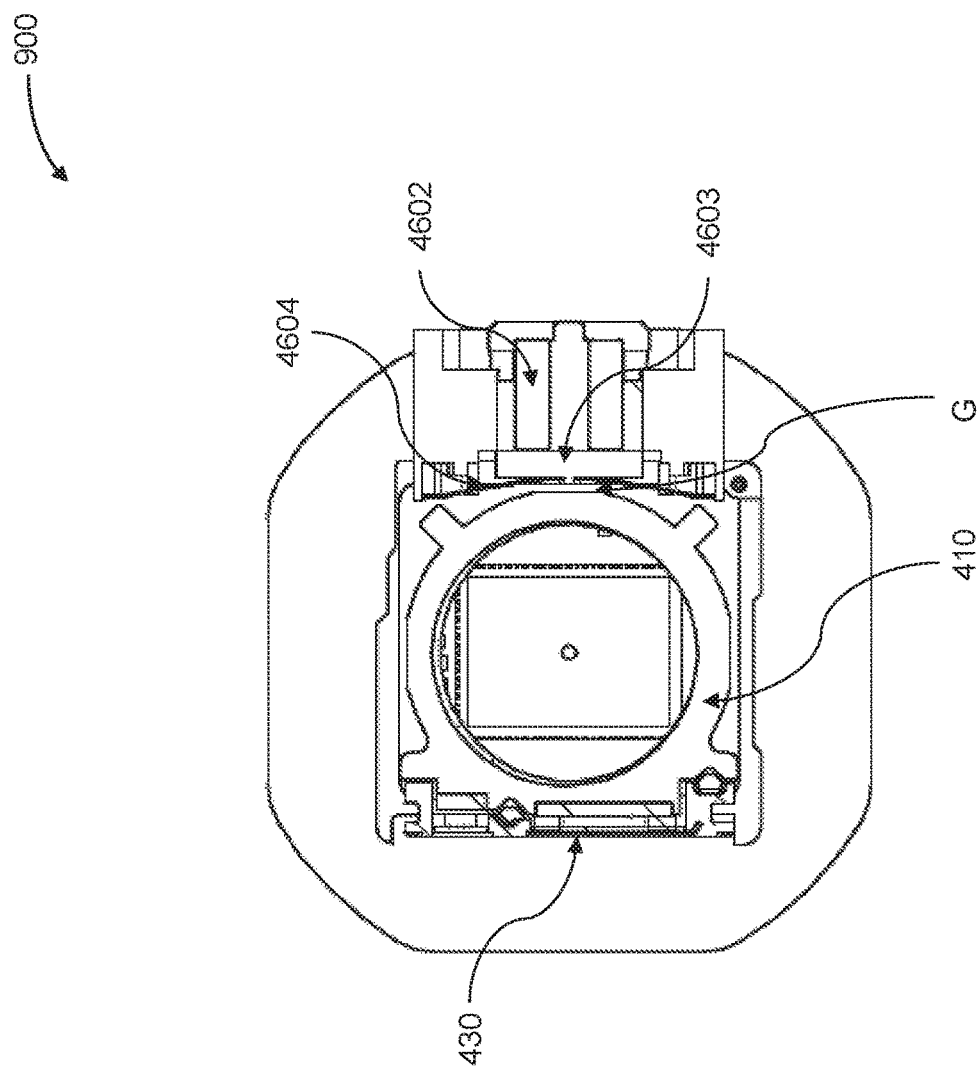
FIG. 9 illustrates still another lens module having a lens locking apparatus comprising an electromagnet, in which the position of lens module is not fixed, in accordance with some embodiments of the disclosure.

FIG. 8 illustrates still another lens module having a lens locking apparatus comprising an electromagnet, in which the position of lens module is fixed, in accordance with some embodiments of the disclosure. FIG. 9 illustrates still another lens module having a lens locking apparatus comprising an electromagnet, in which the position of lens module is not fixed, in accordance with some embodiments of the disclosure. The pressing member 4604 can be an elastic plate. The pressing member can be position at a side of the lens carrier 410 opposite to the driving mechanism 430 of the AF module. The pressing member can exert a compressive force onto the peripheral wall of the lens carrier in a direction F which substantially orthogonally intersects with the optical axis of the lens when the pressing member is at its original position. Alternatively, the elastic plate can exert a compressive force on the lens carrier in a direction F which is substantially oblique to the optical axis when the pressing member is at its original position. The abutting of a pressing member against the lens carrier can be controlled by an electromagnet 4602 which can generate a magnetic field in response to a signal received from the AF module. The two lateral ends of the pressing member can be respectively fixed at opposite side walls of the housing of the lens locking apparatus, and a middle portion of the elastic plate can be deformed in a direction perpendicular to an extending surface of the elastic plate.

As illustrated in FIG. 8, when the focusing process is completed and the lens carrier is at the focused position, the electromagnet can be controlled not to generate a magnetic field, such that the pressing member is released to the original position abutting again the lens carrier. At this time, a compressive force can be exerted onto the peripheral wall of the lens carrier, and the lens carrier can be fixed at the focused position by a friction between the pressing member and the peripheral wall of the lens carrier.

As illustrated in FIG. 9, when the focusing process is in progress, the electromagnet can be controlled to generate a magnetic field to pull the pressing member away from the lens carrier. The pulling of the pressing member can cause a deforming of the pressing member, such that the pressing member does not contact the peripheral wall of the lens carrier, and a gap G is formed between the pressing member and the peripheral wall of the lens carrier. At this time, no compressive force is exerted onto the peripheral wall of the lens carrier, and the lens carrier can translate along the optical axis. In some instance, the iron block 4603 can be fixed to the pressing member on an end adjacent to the electromagnet. The iron block can be pulled toward the electromagnet when a magnetic field is generated by the electromagnet, thus deforming the pressing member toward the electromagnet.

Figure 10:
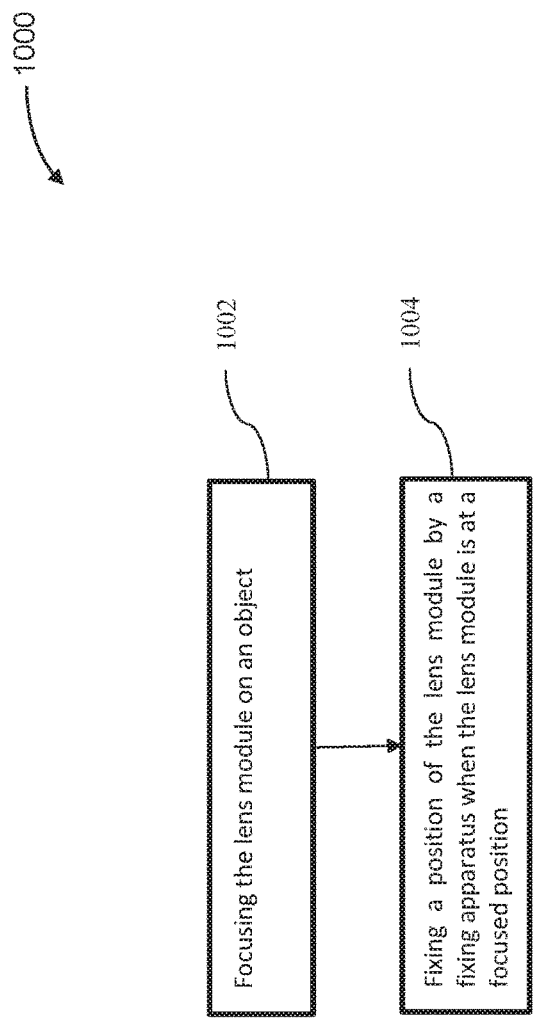
FIG. 10 is a flow chart illustrating a method of fixing a lens module in accordance with embodiments of the disclosure.

FIG. 10 is a flow chart illustrating a method of fixing a lens carrier in accordance with embodiments of the disclosure. The method 1000 can fix a position of the lens carrier when the lens carrier is at the focused position, such that the lens carrier does not move along the optical axis or vibrate when the lens is focused on the object.

In process 1002, the lens carrier can be focused on an object by translating the lens carrier along an optical axis of the lens module. The lens carrier can carry therein at least one optical lens to collect light from the object. The focusing process can be implemented by the AF module, for instance, the driving mechanism of the AF module can translate the lens carrier along the optical axis of the lens carrier in the focusing process. The driving mechanism of the AF module can be a voice coil motor. The AF module can generate a signal indicative of a completion of the focusing process.

In process 1004, a position of the lens module can be fixed by a lens locking apparatus when the lens module is at the focused position. The lens locking apparatus can be configured to apply a compressive force on the lens module when the lens module is at the focused position. The direction of the compressive force can be orthogonal to the optical axis. The lens locking apparatus can apply the compressive force on the lens module in response to receiving the signal indicative of a completion of the focusing process.

In some embodiments, the lens locking apparatus is a pressing member which is urged to apply the compressive force by an actuator when the lens carrier is at the focused position. For instance, the lens locking apparatus can be an elastic plate or a leaf spring which is urged by a cam to apply the compressive force by an actuator when the lens carrier is at the focused position. The compressive force can generate a friction between the pressing member and the lens carrier which is larger than an inertial force generated by a maximum vibration of the lens carrier. Alternatively, the lens locking apparatus is a pressing member which constantly abuts against the lens carrier regardless of a position of the lens carrier. The compressive force can generate a friction between the pressing member and the lens carrier which is smaller than a force generated from the driving mechanism but larger than an inertial force generated by a vibration of the lens carrier, such that the lens carrier can be moved in the focusing process.

Figure 11:
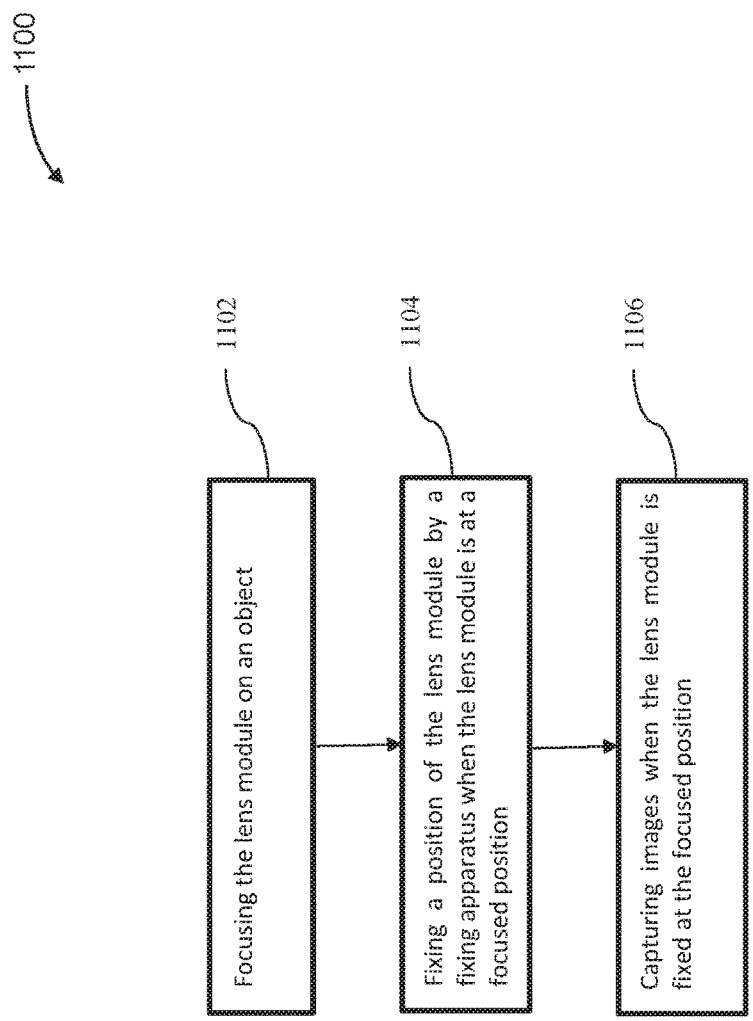
FIG. 11 is a flow chart illustrating a method of capturing images with an imaging device in accordance with embodiments of the disclosure.

FIG. 11 is a flow chart illustrating a method 1100 of capturing images with an imaging device in accordance with embodiments of the disclosure. The imaging device can comprises a lens carrier which carries at least one optical lens, an AF module to implement the focusing process and a lens locking apparatus to fix a position of the lens carrier.

In process 1102, the lens carrier can be focused on an object by translating the lens carrier along an optical axis of the lens module. In process 1104, a position of the lens module can be fixed by a lens locking apparatus when the lens module is at the focused position. The lens locking apparatus can be configured to apply a compressive force on the lens module when the lens module is at the focused position, such that the lens carrier can be secured at the focusing position.

In process 1106, the imaging device can capture images of the object when the lens carrier fixed is at the focused position. Since the lens carrier is fixed at the focused position by the lens locking apparatus, the lens carrier and the at least optical lens carried by the lens carrier do not move along the optical axis or vibrate with respect to the AF module even when the lens carrier experiences vibrations during capturing. A stable imaging can be obtained, for example, the captured images are not blurred due to a loss of focusing.

The systems, devices, and methods described herein can be applied to a wide variety of objects, including movable objects and stationary objects. Any description herein of an aerial vehicle, such as a UAV, may apply to and be used for any movable object. Any description herein of an aerial vehicle may apply specifically to UAVs.

Figure 12:
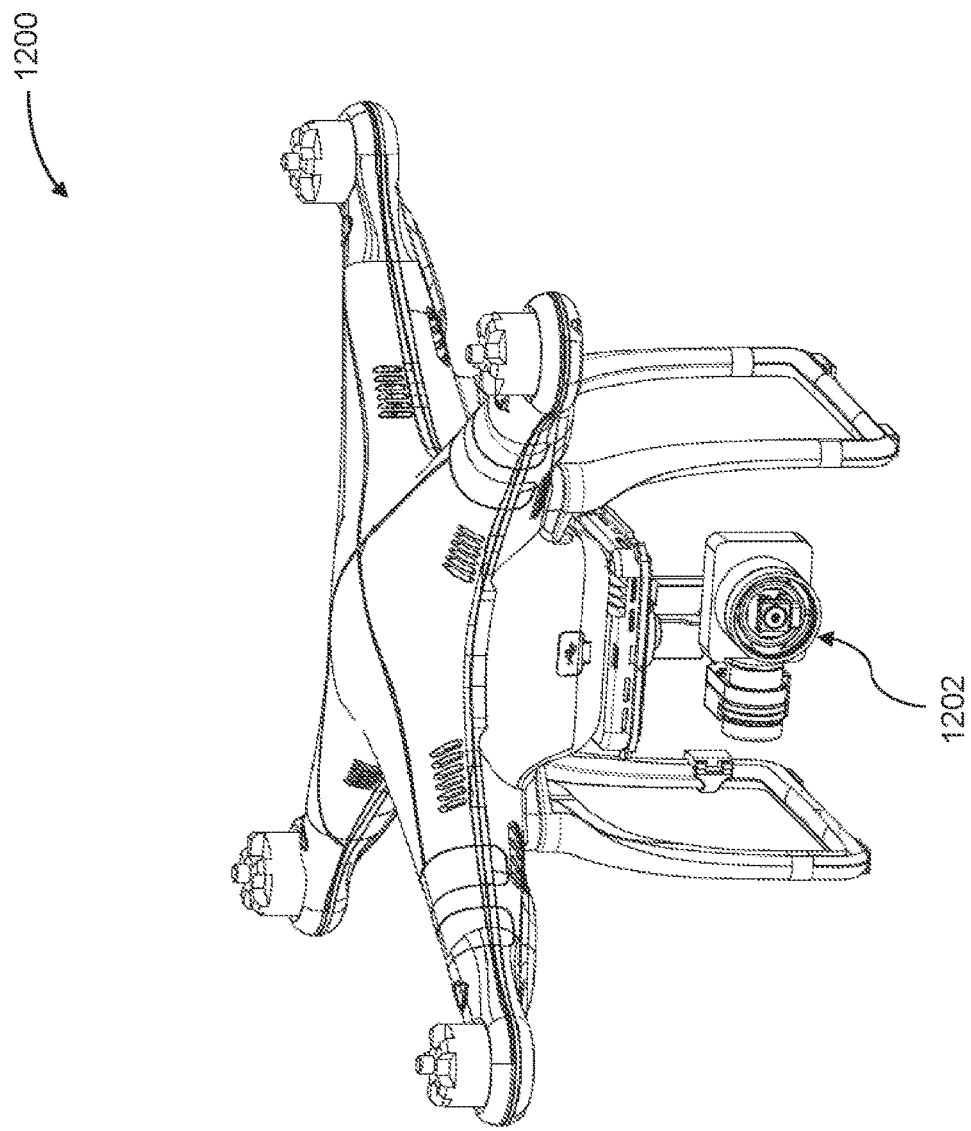
FIG. 12 illustrates a movable object carrying an imaging device, in accordance with embodiments of the present disclosure.

FIG. 12 illustrates a movable object carrying an imaging device, in accordance with embodiments of the present disclosure. The movable object 1200 can be an unmanned aerial vehicle (UAV). The UAV may be an example of a movable object as described herein, to which the method and apparatus of fixing a lens carrier can be applied. The UAV can include a propulsion system having four rotors (not shown) which are respectively disposed at distal ends of the arms. Any number of rotors may be provided (e.g., one, two, three, four, five, six, or more) in accordance with a number of arms of the UAV.

The lens locking apparatus as discussed hereinabove can be provided in an imaging device 1202 having a movable lens. The imaging device having the lens locking apparatus can be a payload of a stabilization platform. The stabilization platform can comprise a frame assembly comprising a plurality of frame components movable relative to one another, the frame assembly being configured to support the imaging device; and a plurality of actuators configured to permit the plurality of frame components to move relative to one another.

During the UAV's flight, vibrations can be generated from the propulsion system. Vibration can also be introduced to the UAV from the environment such as air turbulence. Only a portion of the vibration can be filtered out or compensated by damping devices and the stabilization platform, and the imaging device onboard the UAV may still experience vibrations which may adversely affect the imaging quality and make the captured images blurred. The lens locking apparatus as provided in the imaging device can fix the lens carrier and the at least one optical lens at the focused position upon completion of the focusing process, such that the lens does not move along the optical axis or vibrate, and the focus on the captured object is secured. Therefore, a stable imaging can be obtained, for example, the captured images are not blurred due to a loss of focusing.

The lens locking apparatus as discussed hereinabove can be provided in an imaging device 1202 having a manual focus module. The lens locking apparatus can fix the lens carrier and the at least one optical lens at the focused position after the user manually focus the lens onto an object, such that the lens does not move along the optical axis or vibrate, and the focus on the captured object is secured.

While some embodiments of the present disclosure have been shown and described hereinabove, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the invention and that methods and structures within the scope of these claims and their equivalents be covered thereby.

What is claimed is:

1. A lens locking apparatus configured to be coupled to a lens module, the lens module being configured to focus on an object by translating along an optical axis of the lens module, the lens locking apparatus comprising:
    a pressing member configured to fix a position of the lens module by abutting against the lens module, the lens module including one or more optical lenses and a lens carrier configured to be driven by a driving mechanism to carry the one or more optical lenses to translate along the optical axis, and the pressing member being disposed at a side of the lens carrier opposite to the driving mechanism and being configured to abut against the lens carrier;
    a cam including an eccentric wheel configured to drive the pressing member to control abutting of the pressing member against the lens module; and
    a motor configured to, in response to a signal indicative of the lens module being at a focused position, rotate the cam to contact the pressing member to fix the lens module at the focused position.

2. The lens locking apparatus of claim 1, wherein the one or more optical lenses are configured to collect light from the object.

3. The lens locking apparatus of claim 1, wherein the pressing member is configured to abut against a peripheral wall of the lens module.

4. The lens locking apparatus of claim 1, wherein a friction between the pressing member and the lens module is larger than an inertial force generated by a vibration of the lens module.

5. The lens locking apparatus of claim 1, wherein the pressing member comprises an elastic plate.

6. The lens locking apparatus of claim 5, wherein:
    the elastic plate is configured to fix the position of the lens module by abutting against the lens module;
    the eccentric wheel is arranged to be in direct contact with the elastic plate and configured to drive the elastic plate by directly contacting the elastic plate; and
    the motor is configured to rotate the cam to contact the elastic plate to fix the lens module at the focused position.

7. The lens locking apparatus of claim 1, wherein the pressing member comprises a leaf spring.

8. The lens locking apparatus of claim 1, wherein the pressing member is configured to exert a compressive force on the lens module in a direction substantially orthogonal to the optical axis.

9. The lens locking apparatus of claim 1, wherein a friction between the pressing member and the lens module is smaller than a force generated from a focusing module configured to focus the lens module but larger than an inertial force generated by a vibration of the lens module.

10. The lens locking apparatus of claim 1, wherein:
    the lens carrier is configured to carry the one or more optical lenses to translate through an Auto Focus (AF) module along the optical axis; and
    the pressing member is disposed at one of a plurality of side walls of the AF module.

* * * * *